United States Patent Office 3,315,981
Patented Apr. 25, 1967

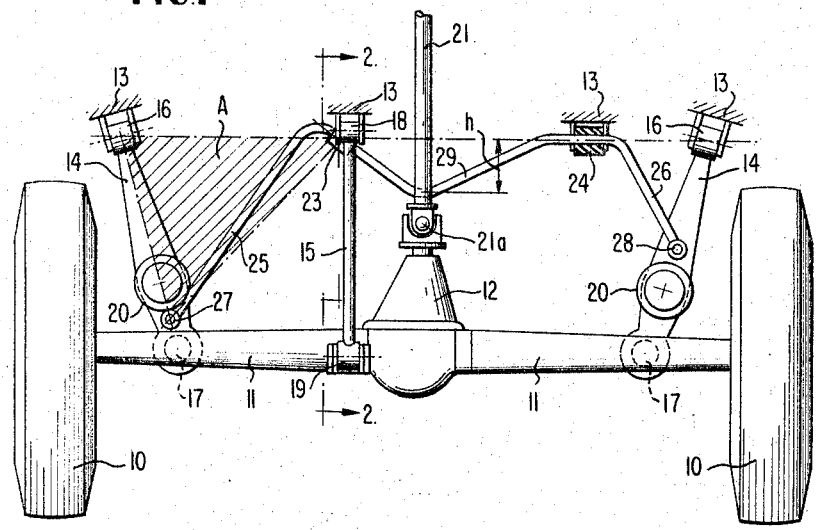
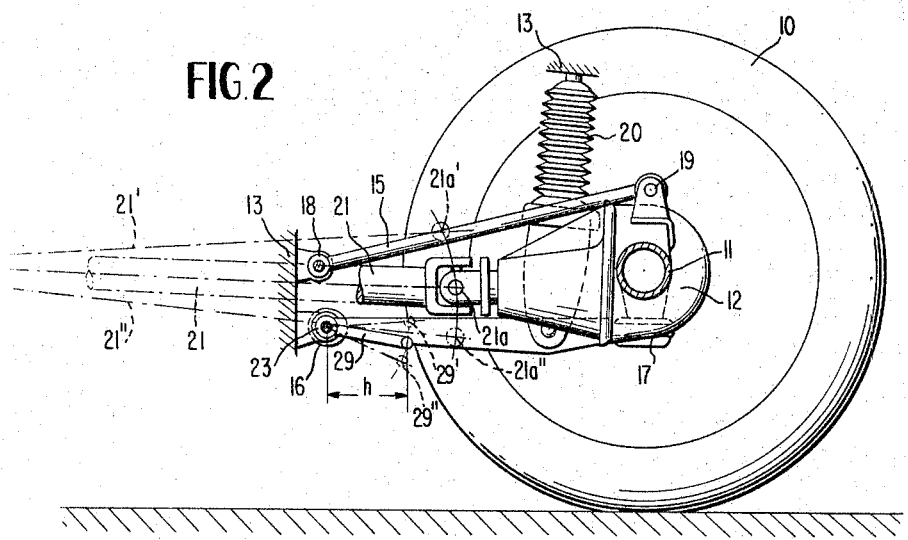
INVENTOR
FRANZ G. F. BEHLES

3,315,981
WHEEL SUSPENSION
Franz G. F. Behles, Ingolstadt, Germany, assignor to Daimler-Benz Aktiengesellschaft, Stuttgart-Unterturkheim, Germany
Filed Feb. 26, 1965, Ser. No. 435,617
Claims priority, application Germany, Feb. 29, 1964, D 43,770
15 Claims. (Cl. 280—124)

The present invention relates to an axle suspension for motor vehicles, especially those having a rigid axle, by means of a wheel axle guided by thrust guide members and by means of a torsion rod stabilizer spring-supporting unequal deflections of the wheels against the vehicle superstructure, whereby the thrust guide members connect the wheel axle with the vehicle superstructure so as to be movable in the lateral direction.

Wheel suspensions of rigid axles are known in the prior art which are supported with respect to the vehicle superstructure by laterally non-guiding thrust members or springs, whereby for purposes of absorbing forces directed transversely to the vehicle longitudinal direction, transverse guide members are provided between the axle and the vehicle superstructure in the form of so-called Panhard-rods. Such additional cross guide elements, however, increase the cost of construction.

The present invention aims, above all, at eliminating this disadvantage and essentially consists in that at least one bearing support of the stabilizer near one side of the vehicle is arranged at a relatively large distance from the bearing joint near the side of the vehicle of the associated thrust guide member in such a manner that the arm of the stabilizer pivotally connected with the axle or with the thrust guide member forms together with the thrust guide member a support-triangle of the wheel axle swinging or pivoting about the bearing support axis of the thrust guide member. The stabilizer is thereby rendered suited for the absorption of the transverse forces between the wheel axle and the vehicle superstructure so that additional cross support elements such as, for example, cross guide members or vertical guide means of the axle may be dispensed with.

The stabilizer may be utilized with one or possibly also with both its ends for the cross support of the axle. The ends of the stabilizer serving as cross support is preferably connected directly with the thrust guide member, possibly also with the rigid axle in proximity of the thrust guide member. With an exclusively one-sided use of the stabilizer for the cross support of the axle, the other end of the stabilizer may be connected by the interposition of pivot joint means, for example, of a vertically arranged intermediate guide element or the like, with the other thrust guide member or with another part swinging in unison with the axle.

As to the rest, the wheel axle may be guided in any suitable, appropriate manner, preferably in the manner of a quadrilateral joint system whose lower side is formed by the thrust guide members and whose upper side is constituted by a central longitudinal guide member arranged, for example, adjacent the axle gear housing so that the axle is to carry out swinging movements about a vehicle longitudinal axis.

For the absorption of shocks and for the equalization of differences in movement between the parts guiding the axle, the thrust and/or longitudinal guide members and/or stabilizer may be supported at and/or pivotally connected with the wheel axle or with one another by the interposition of conventional rubber cushions.

Accordingly, it is an object of the present invention to provide a wheel suspension, especially for rigid axles of motor vehicles which obviates, by simple means, the aforementioned drawbacks encountered with the prior art construction.

Another object of the present invention resides in the provision of a wheel suspension for rigid rear axles of motor vehicles which is relatively inexpensive in manufacture yet assures completely satisfactory absorption of transversely directed forces.

Still another object of the present invention resides in the provision of a vessel suspension for rigid axles utilizing longitudinally directed thrust guide members which obviates the need for separate transverse guide members in order to absorb transversely directed forces and shocks.

A further object of the present invention resides in the provision of a wheel suspension for rigid axles which utilizes in an appropriate and purposeful manner, the already existing stabilizer for purposes of absorbing transversely directed forces.

These and other objects, features, and advantages of the present invention will become more obvious from the following description when taken in connection with the accompanying drawing, which shows, for purposes of illustration only, one embodiment in accordance with the present invention and wherein:

FIGURE 1 is a somewhat schematic plan view on the rear axle suspension in accordance with the present invention; and FIGURE 2 is a side-elevational view of the wheel suspension of FIGURE 1, in cross section taken along line 2—2 of FIGURE 1.

Referring now to the drawing wherein like reference numerals are used throughout the two views to designate like parts, the rear wheels 10 are supported on a rigid axle 11 which, together with the rear axle gear 12, forms an axle unit.

The rigid axle 11 is guided in a parallelogram-like manner on the vehicle superstructure, indicated only schematically at 13, by the two lower lateral thrust guide members 14, on the one hand, and by an upper thrust guide member 15, on the other. The thrust guide members 14 and 15 are thereby pivotally connected, on the one hand, at the vehicle superstructure 13, and, on the other, at the rigid axle 11 by the interposition of conventional rubber joints 16, 17, 18 and 19, respectively. Coil springs, pneumatic springs 20 or the like serve for the spring support of the axle 11 with respect to the vehicle superstructure 13. A Cardan shaft 21 serves for the drive of the wheels which, for example, in the usual manner is operatively connected at the forward end by means of a Cardan joint with a driving part supported at the vehicle superstructure, for intsance, of a change-speed transmission and by a rear Cardan joint 21a at a driving part of the axle gear 12.

When the axle 11 togethed with the wheels 10 undergoes spring deflections in the upward or downward directions, it is guided approximately parallelly by the thrust guide members 14 and 15, whereby the Cardan shaft 21 partakes in the stroke movements of the axle and/or of the axle gear 12 by a swinging movement between an upper position 21' and a lower position 21". Unequal stroke movements of the wheels 10 about a vehicle longitudinal axis are made possible in the illustrated wheel suspension in that the lateral thrust guide members 14, for example, by reason of the elastic pivotal connection thereof, are able to yield slightly in the vehicle transverse direction. The axle 11 may hereby swing or pivot approximately about the joint 19 of the upper thrust guide member 15.

For the absorption of forces which act in the transverse direction of the vehicle between the axle 11 and the vehicle superstructure 13 serves the stabilizer 22 constructed as torsion rod which additionally spring-supports in the usual manner unequal spring deflections of the two wheels 10, for example, when driving through a curve. Stabilizer 22 is suported in rubber bearings 23 and 24 at the vehicle superstructure 13, and more particularly, in the same vertical transverse plane as well as preferably also at the same height as the joints 16 of the lateral thrust members 14. The joints 23 and 24 are thereby disposed in relatively close proximity to the vertical longitudinal center plane of the vehicle containing, for example, the Cardan shaft 21 so that they have a relatively large distance from the adjacent joints 16 of the lateral thrust guide members 14. The arms 25 and 26 forming the end parts of the stabilizer 22 are directed obliquely outwardly whereby the arm 25 is pivotally connected by a conventional rubber cushion joint 27 that is similar to the joint 16 in proximity to the joint 17, preferably directly at the corresponding lateral thrust guide member 14 and the arm 26 by a joint 28—also directly or possibly by means of a vertical intermediate guide element—at a center portion of the oppositely disposed thrust guide member 14. The one thrust guide member 14 and the arm 25 thereby form the triangular bracing or strutting A indicated by the cross hatching in FIGURE 1 for the absorption of cross forces acting between the axle 11 and the vehicle superstructure 13. These transversely directed forces are transmitted to the vehicle superstructure by way of the bearing 23 which is inclined for that purpose and is preferably disposed approximately perpendicularly to the torsion rod arm 25 or to the connecting line 27–23.

Possibly the other thrust guide member 14 and the arm 26 of the stabilizer 22 may form a corresponding triangular bracing or strutting since by reason of the yieldingness in bending by the arms 25 and 26, swinging movements of the axle 11 about a vehicle longitudinal axis are also permitted without difficulty notwithstanding the differences in movement occurring under such spring deflections. Arms 25 and 26 and bearings 23 and 24 may also be arranged and constructed symmetrically to the vehicle longitudinal center axis. In many cases, for example, by reason of the connection of a control mechanism for maintaining a predetermined road clearance of the vehicle superstructure, an asymmetric arrangement—approximately as shown in the drawing—may be more appropriate.

As may be clearly seen from the drawing, the center part 29 of the stabilizer 22 is cranked rearwardly toward the axle 11 from the bearings 23 and 24 thereof. If the axle 11 is spring-deflected upwardly or downwardly as a unit, then the crank portion 29 also participates in this swinging movement corresponding to the lever arm $h$ of the crank portion 29 between the end positions 29' and 29''. The Cardan shaft 21 is thereby able to swing without impairment by the stabilizer between the end positions 21' and 21'' thereof or between the end positions 21a' and 21a'' of the joint 21a.

While I have shown and described one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A wheel suspension for motor vehicles having a vehicle superstructure especially for motor vehicles having a rigid axle, comprising:

axle means for supporting thereon the wheels, first means including thrust guide means connecting said axle means at each outer end with the vehicle superstructure while allowing substantial movements of said axle means in the lateral direction, and second means including a stabilizer torsion bar spring means spring-supporting said axle means with respect to the vehicle superstructure for transmitting torsion from the deflection of one wheel to the other wheel in case of unequal spring deflections of the two wheels, said first and second means including bearing joint means for pivotally connecting said thrust guide means and torsion bar spring means at said vehicle superstructure, said torsion bar spring means having arm portions extending from said bearing joint means to the free ends thereof and the free ends operatively connected with said thrust guide means and said axle means for deflection proportionate to the deflection of the wheels, at least one of the bearing joint means of the torsion bar spring means at the vehicle superstructure being disposed at a relatively large distance in the transverse direction of the vehicle from the bearing joint means of the associated one thrust guide means at the vehicle superstructure in such a manner that the corresponding one arm portion of the torsion bar spring means forms, with said associated thrust guide means, supporting triangle means for absorbing transversely directed forces and pivoting about said joint means at the vehicle superstructure.

2. A wheel suspension for motor vehicles according to claim 1, said torsion bar spring means being supported at said vehicle superstructure at least in lateral proximity to the bearing axis of the thrust guide bearing joint means and being pivotally connected with one of the two parts consisting of thrust guide means and axle means at least in proximity to the joint means connecting the thrust guide means with the axle means.

3. A wheel suspension for motor vehicles according to claim 1, said thrust guide means forming, as viewed in side view, a quadrilateral guide system whose lower side is constituted by the thrust guide means and whose upper side is formed by a vertically spaced center thrust guide member arranged adjacent the axle gear housing of the axle means.

4. A wheel suspension for motor vehicles according to claim 1, the bearing joint means operatively connecting the thrust guide means and torsion bar spring means each including rubber cushion means for allowing rocking motion relative to their respective axes.

5. A wheel suspension for motor vehicles according to claim 1, the bearing joint means of the torsion bar spring means which is disposed adjacent the torsion bar one arm portion serving for the transverse support being arranged with the pivot axis thereof skewed to form an oblique angle with respect to the bearing axis of the respective thrust guide means bearing joint means.

6. The combination according to claim 5, wherein the pivot axis of said last-mentioned one arm portion bearing joint means extends substantially perpendicularly to said arm portion.

7. A wheel suspension for motor vehicles according to claim 1, rigid axle means supporting thereon the wheels having a rigid axle gear with a drive shaft extending toward the engine, said bearing joint means for said torsion bar spring means being located on opposite sides of said drive shaft to define a central portion of said torsion bar spring means therebetween, said central portion extending horizontally longitudinally away from each respective bearing joint means toward a substantially central point closely adjacent said drive shaft to provide deflection of said central point along with and substantially equal to the deflection of said drive shaft produced by the deflection of the wheels.

8. A wheel suspension system according to claim 7, wherein said one arm portion extends outwardly obliquely to the vehicle longitudinal center plane.

9. A wheel suspension according to claim 8, wherein each of said bearing support means for said torsion bar means has a pivot axis extending approximately perpendicular to the connecting line between said last mentioned bearing support means and the corresponding free end.

10. A wheel suspension according to claim 7, wherein only one arm portion of said torsion rod stabilizer means is used for supporting said axle means in the transverse direction.

11. A wheel suspension system according to claim 10, further comprising pivotal connecting means pivotally connecting the opposite other arm portion of said torsion bar stabilizer with the other thrust guide means within a central region of the latter.

12. A wheel suspension for motor vehicles having a vehicle superstructure, especially for motor vehicles having a rigid axle, comprising:
  axle means for supporting thereon the wheels,
  first means including thrust guide means connecting said axle means with the vehicle superstructure while allowing movements of said axle means in the lateral direction,
  and second means including torsion bar spring means spring-supporting said axle means with respect to the vehicle superstructure in case of unequal spring deflections of the two wheels,
  said first and second means including bearing joint means pivotally connecting said thrust guide means and torsion bar spring means at said vehicle superstructure,
  said torsion bar spring means having arm portions operatively connected with said thrust guide means,
  at least one of the bearing joint means of the torsion bar spring means at the vehicle superstructure being disposed at a relatively large distance in the transverse direction of the vehicle from the bearing joint means of the associated thrust guide means at the vehicle superstructure in such a manner that the corresponding arm portion of the torsion bar spring means pivotally connected with the respective thrust guide means forms a supporting triangle absorbing transversely directed forces and pivoting about the bearing axis of the joint means connecting said last-mentioned thrust guide means at the vehicle superstructure,
  only one end of said torsion bar spring means being used for the transverse support of the wheel axle means while the other end of the torsion bar spring means is pivotally connected at one of the two parts consisting of the axle means and the thrust guide means, and intermediate connecting means pivotally connecting said other end with one part.

13. The combination according to claim 12, wherein said intermediate connecting means includes an approximately vertical guide member pivotally connected with said one part.

14. A wheel suspension for motor vehicles having a vehicle superstructure, especially for motor vehicles having a rigid axle, comprising:
  axle means for supporting thereon the wheels,
  first means including thrust guide means connecting said axle means with the vehicle superstructure while allowing movements of said axle means in the lateral direction,
  and second means including torsion bar spring means spring-supporting said axle means with respect to the vehicle superstructure in case of unequal spring deflections of the two wheels,
  said first and second means including bearing joint means for pivotally connecting said thrust guide means and torsion bar spring means at said vehicle superstructure,
  said torsion bar spring means having arm portions operatively connected with said thrust guide means,
  at least one of the bearing joint means of the torsion bar spring means at the vehicle superstructure being disposed at a relatively large distance in the transverse direction of the vehicle from the bearing joint means of the associated thrust guide means at the vehicle superstructure in such a manner that the corresponding arm portion of the torsion bar spring means pivotally connected with the respective thrust guide means forms a supporting triangle absorbing transversely directed forces and pivoting about the bearing axis of the joint means connecting said last-mentioned thrust guide means at the vehicle superstructure,
  only one end of said torsion bar spring means being connected directly with one of the two parts consisting of said thrust guide means and said axle means in proximity to the connecting joint means connecting the adjacent thrust guide means with the axle means while the other end of said torsion bar spring means is pivotally connected in a center portion of the other thrust guide means,
  the bearing joint means operatively connecting the thrust guide means and torsion bar spring including rubber cushion means.

15. The combination according to claim 14, further comprising an intermediate approximately vertical guide member operatively connecting the other end of said torsion bar spring means with said center portion.

References Cited by the Examiner

UNITED STATES PATENTS

| | | | |
|---|---|---|---|
| 2,556,630 | 6/1951 | Panhard | 280—124 |
| 2,757,747 | 8/1956 | MacPherson | 280—124 |
| 2,763,494 | 9/1956 | Toms | 280—124 |
| 3,205,967 | 9/1965 | Stotz | 280—124 X |

FOREIGN PATENTS

| | | |
|---|---|---|
| 1,152,024 | 7/1963 | Germany. |

MILTON BUCHLER, *Primary Examiner.*

BENJAMIN HERSH, *Examiner.*

M. S. SALES, P. GOODMAN, *Assistant Examiners.*